Oct. 18, 1932. E. P. KINNE Re. 18,631

COUPLER MECHANISM

Original Filed Oct. 7, 1926 2 Sheets-Sheet 1

Inventor
Edmund P. Kinne.

By Wilkinson Shepley Byron & Knight Attys.

Oct. 18, 1932. E. P. KINNE Re. 18,631

COUPLER MECHANISM

Original Filed Oct. 7, 1926 2 Sheets-Sheet 2

Witness:
R. Burkhardt.

Inventor:
Edmund P. Kinne,
By Wilkinson, Shipley, Byron & Knight
Attys.

Reissued Oct. 18, 1932

Re. 18,631

UNITED STATES PATENT OFFICE

EDMUND P. KINNE, OF ALLIANCE, OHIO, ASSIGNOR TO AMERICAN STEEL FOUNDRIES, OF CHICAGO, ILLINOIS, A CORPORATION OF NEW JERSEY

COUPLER MECHANISM

Original No. 1,639,301, dated August 16, 1927, Serial No. 139,964, filed October 7, 1926. Application for reissue filed April 25, 1929. Serial No. 358,129.

This invention pertains to coupler mechanism in which an embodiment is illustrated as being in the form of an uncoupling rod for a coupler operable at a point remote from the coupler.

In Patent No. 1,639,300, granted August 16, 1927, there is disclosed and claimed improved means for operating a coupler lock from lock position to lock set position and to full knuckle throw position, and this invention relates to the same general subject-matter.

An object of the invention is to improve the operation of couplers, and more particularly standard A. R. A. couplers, in a manner whereby a coupler can always be operated positively and freely to full lock set or full knuckle throw positions through the medium of the uncoupling rod.

Another object is to provide simple, reliable and efficient coupler operating mechanism provided with cooperating parts having a tendency to prevent any swinging movement of the operating rod handle or rotation of the operating rod which would release the coupler anti-creep and which functions in an improved manner to accomplish the best results under service conditions.

Still another object of the invention is to provide coupler operating mechanism which will fulfill all requirements of service and manufacture and in which the operating handle will always seek a position such that there will be no tendency to disrupt the parts nor to have any interference with the relative movement of the coupled cars or cooperating parts.

A further object is to provide a coupler uncoupling mechanism which may be applied to existing as well as especially adapted couplers and which will effect a great saving in the number of parts now in use. For instance, the mechanism disclosed in the present invention will serve to eliminate the use of slack devices between the operating rod and the coupler lifter.

Still further object is to provide uncoupling mechanism whereby the full knuckle throw position may be obtained by a minimum turning operation of the uncoupling rod.

Yet further object is to provide coupler mechanism embodying an uncoupling rod operable at a point remote from the coupler, the uncoupling rod being provided with supporting means permitting relative movement between the uncoupling rod and the supporting means whereby relative operating relation between the rod and the lock is substantially unchanged upon movement of the coupler when the coupler is in locked position, and wherein the uncoupling rod is normally held by an abutment upon the car in such a position that the weight of the uncoupling rod is unbalanced with respect to a vertical plane passing through its axis of rotation whereby the unbalanced condition resists swinging movement of the rod in a direction for release of the coupler anti-creep.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary sectional elevation through a standard A. R. A. bottom lift type of coupler, the lock being shown in locked position;

Figure 1:
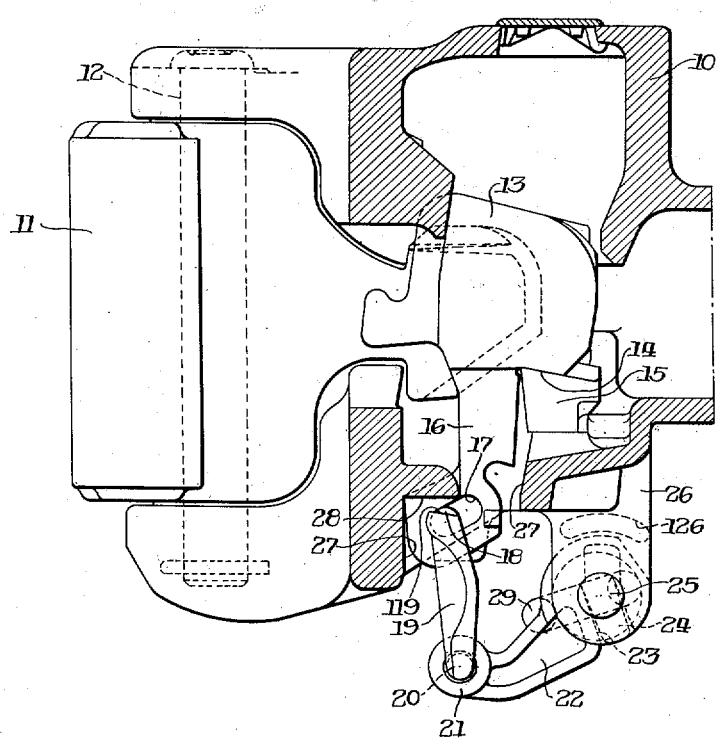
Figure 2:
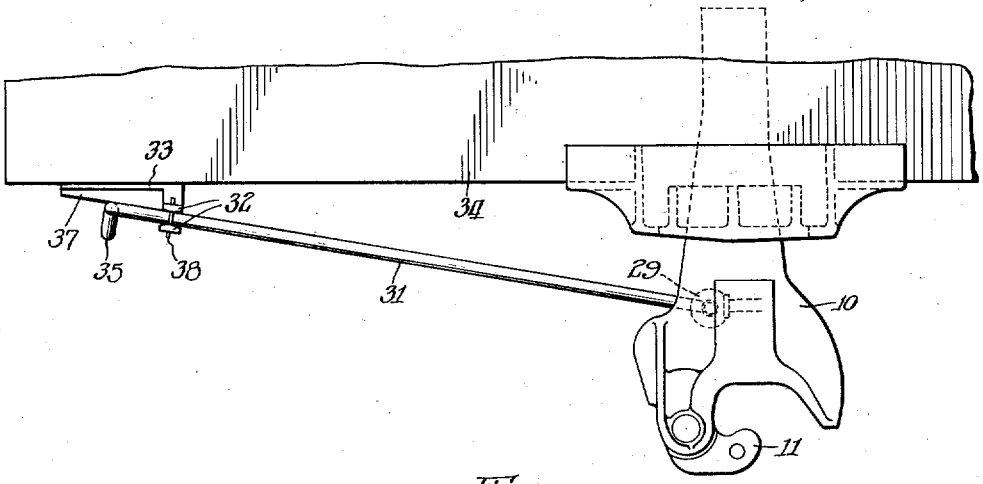
Figure 2 is a fragmentary top plan view of the coupler and uncoupling rod embodying the invention, showing the same as applied to the end of a railway car.
Figure 3:
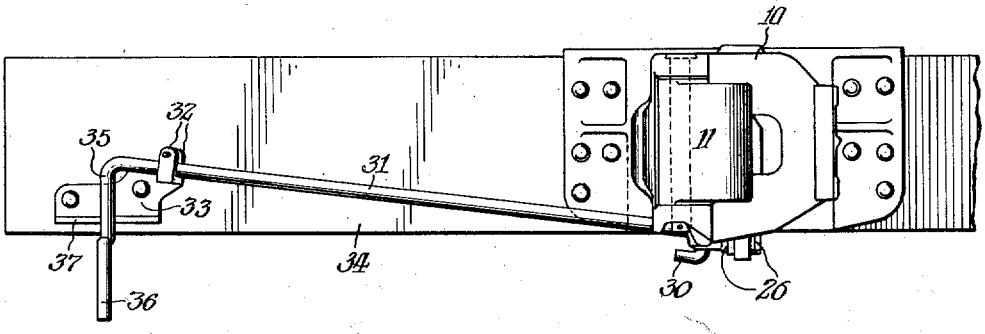
Figure 3 is a front elevation of the coupler mechanism arrangement illustrated in Figure 2.

Referring to the figures of the drawings, it will be noted that the invention is illustrated in connection with a standard A. R. A. type of coupler having a head 10 to which a knuckle 11 is pivoted by a pin 12. As shown more particularly in Figure 1, the knuckle 11 is held in closed position by a lock 13, in which position a rear shoulder 14 of the lock rests upon the knuckle opener 15. The lock 13 has a depending leg 16, the lower end of which is provided with an inclined slot 17 adapted to slidably receive a transverse finger 18 of a lifter link 19, the other end of which has a transverse finger 20 received within the outer eye portion 21 of a lifter arm 22. The inner end of the lifter arm 22 is of bifurcated formation, having a slot 23 for receiving a key portion 24 of a rotary member or rotor 25 supported between depending lugs 26 formed on the lower portion of the head 10 just to the rear of the bottom lock hole 27, an arcuate web 126 being provided for preventing dissociation of the lifter arm from the rotor.

The coupler head 10 is provided with an anti-creep member 28 which may be in the form of a ledge adjacent the hole 27 having cooperative relation with an anti-creep member in the form of a shoulder 119 formed on the lifter link 19. From the arrangement thus far described, it will be appreciated that if the rotor 25 is rotated in a clockwise direction, as viewed in Figure 1, the finger 18, which is normally in the lower part of the slot 17, will be moved into the upper end of the slot 17 for releasing any engagement between the anti-creep members 119 and 28, whereupon the lock 13 will be raised from the locked position shown in Figure 1 to lock set position. Upon further rotation of the rotor 25 in the same direction, the lock 13 will be moved into full knuckle throw position, all as fully described in Patent No. 1,639,300.

Figure 4:
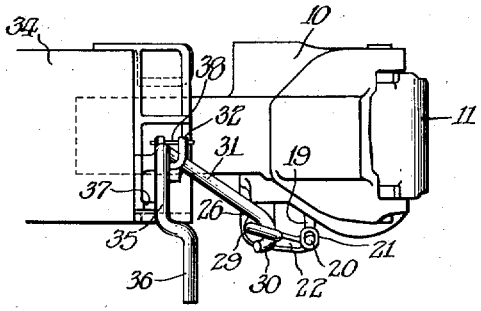
Figure 4 is a fragmentary side elevation of the coupler mechanism arrangement illustrated in Figures 2 and 3.

One end of the rotor 25 is provided with an eye 29 which receives a hook 30 disposed on the inner end of an operating or uncoupling rod 31. The outer end of the uncoupling rod is slidably supported in a bearing formed between two guide lugs 32 provided on the inner end of a bracket 33 secured to the car end structure 34 near the outer end of the latter. The outer end of the uncoupling rod 31 terminates in a handle 35 preferably having a portion 36 offset away from the car, as shown in Figure 4, whereby weight is provided tending normally to rotate the uncoupling rod in a counterclockwise direction, as viewed in Figure 1, or in other words, in a direction towards the bracket where, in conjunction with the bracket, there is a tendency to prevent oscillation whereby a release of the anti-creep members 119 and 28 is prevented.

The uncoupling rod 31 is supported by the bracket and preferably is loosely mounted between the guide lugs 32 for permitting centering of the coupler 10, that is, permitting relative movement between the uncoupling rod and the bracket. The uncoupling rod extends at an angle to the horizontal transverse center of the coupler and preferably extends in a straight line inwardly and forwardly, as shown from the guide lugs 32 of the bracket 33 to the eye 29 of the rotor 25. In this way the uncoupling rod is shorter and lighter than those heretofore used. By disposition of the uncoupling rod in a manner analogous to that described, the necessity of supporting the operating rod at its inner end by an additional bracket secured to the car end structure or to the coupler is eliminated.

The guide lugs 32 of the bracket preferably extend in the same general angular direction as the uncoupling rod 31, as does the front guide edge of the outwardly extending flange or cam 37 of the bracket 33. The upper part of the handle 35 normally engages the guide flange 37 in coupler lock position, and the outer part of the uncoupling rod 31 engages the guideway formed by the guide lugs. Any locking means, such as a retaining pin 38 extending between the guide lugs 32, locks the uncoupling rod in position.

With this arrangement, even though there may be relative movement between the hook 30 and the eye 29, the guide flange 37 prevents the handle 38, due to inertia as in the case of swinging movement caused by the cars in a train, releasing the coupler anti-creep, and the unbalanced condition of the operating rod also tends to prevent the release of the coupler anti-creep. The guide flange 37 normally cooperates with the handle 36 in coupler lock position whereby the relative operating relation between the rod and the lock is substantially unchanged upon lateral movement of the coupler. By means of this arrangement, it is a simple matter to operate the lock 13 from the side of the car by merely rotating the handle 36 of the uncoupling rod upwardly in a counterclockwise direction, as viewed in Figure 4, and the weight of the parts is such that there is a normal tendency to return the parts toward coupler lock position.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In combination, a coupler having a head and a lock operable therein, a rotary member for transmitting operating movements to the coupler lock, a bracket adapted to be secured to the car end structure and having an inclined guideway and an inclined guide flange, and an operating rod guidedly supported in said inclined guideway portion and having a handle cooperating with said inclined guide flange, said operating rod extending from said bracket in a straight line to said rotary member for rotating the latter for operating the coupler lock, said interengaging portions of the operating rod and its handle with said inclined portions facilitating centering movements of said coupler.

2. In a railway car, an operating means for use with a coupler mounted upon the car so as to move longitudinally and laterally thereof in service and having a member mounted upon the coupler to move therewith and arranged to operate the coupler upon rotation thereof; comprising, an uncoupling rod rotatably supported at its outer end upon the car and operatively connected at its inner end to said member, said rod comprising a depending operating handle at its outer end, and an abutment upon said car positioned to hold said rod in normal position such that the handle serves to provide a weighted portion out of line with the axis of revolution of the rod to produce an unbalanced condition tending to urge said handle in a direction towards said abutment whereby to resist swinging movement of said handle in a direction for release of the coupler.

3. In a railway car, an operating means for use with a coupler mounted upon the car so as to move longitudinally and laterally thereof in service and having a member mounted upon the coupler to move therewith and arranged to operate the coupler upon rotation thereof; comprising, an uncoupling rod rotatably supported at its outer end upon the car and extending substantially in a vertical plane at an angle with respect to said car for operative connection at its inner end with said member, said rod comprising a depending operating handle at its outer end, said rod having an offset portion whereby the center of gravity of said rod is offset with respect to the axis of rotation thereof, and an abutment upon said car positioned to hold said coupling rod in normal position such that the weight of the rod acting at the center of gravity is unbalanced with respect to a vertical plane passing through its axis of rotation and said unbalanced condition tends to urge said handle in a direction for rotation towards said abutment whereby to resist swinging movement of said handle in a direction for release of said coupler.

4. In a railway car, an operating means for use with a coupler mounted upon the car so as to move longitudinally and laterally thereof in service and having a member mounted upon the coupler to move therewith and arranged to operate the coupler upon rotation thereof; comprising, an uncoupling rod rotatably supported at its outer end upon the car and extending substantially in a vertical plane at an angle with respect to said car for operative connection at its inner end with said member, said rod comprising a depending operating handle at its outer end and an inclined abutment upon said car positioned to engage said handle in normal position for guiding the endwise movement of said rod during lateral movement of said coupler and said rod when in normal position having its center of gravity offset with respect to a vertical plane passing through its axis of rotation whereby to produce an unbalanced condition of said handle tending to urge said handle in a direction for rotation towards said abutment whereby to resist swinging of said handle in a direction for release of the coupler.

5. In a railway car, an operating means for use with a coupler mounted upon the car so as to move longitudinally and laterally thereof in service and having a member mounted upon the coupler to move therewith and arranged to operate the coupler upon rotation thereof; comprising, an uncoupling rod, means upon said car supporting the outer end of said rod for rotatable and endwise movement, said rod being connected at its inner end directly to said member, an abutment upon said car positioned to engage said rod for holding said rod in normal position and said rod having a portion offset from a vertical plane passing through the axis of rotation of said rod, said offset portion in normal position of said rod serving to produce an unbalanced condition of said rod tending to rotate said rod in a direction to engage said abutment and in a direction to resist swinging movement thereof in a direction for release of said coupler.

6. In a railway car, an operating means for use with a bottom lift coupler having an anti-creep and mounted upon said car so as to move longitudinally and laterally thereof in service and having a member mounted upon the coupler to move therewith and arranged to operate the coupler upon rotation thereof; comprising, an uncoupling rod rotatably supported at its outer end upon the car and operatively connected at its inner end to said member, said rod comprising a depending operating handle at its outer end and an abutment upon said car positioned to hold said handle in normal position such that the weight of the rod is unbalanced with respect to a vertical plane passing through its axis of rotation and said unbalanced condition tends to urge said handle in a direction towards said abutment whereby to resist swinging movement of said handle in a direction for release of the coupler anti-creep.

7. In a railway car, an operating means for use with a bottom lift coupler having an anti-creep and mounted upon said car so as to move longitudinally and laterally thereof in service and having a member mounted upon the coupler to move therewith and arranged to operate the coupler upon rotation thereof; comprising, an uncoupling rod rotatably supported at its outer end upon the car and extending substantially in a vertical plane at an angle with respect to said car for operative connection at its inner end with said member, said rod comprising a depending operating handle at its outer end and an inclined abutment upon said car positioned to engage said rod in normal position for guiding the endwise movement of said rod during lateral movement of said coupler and said rod when in normal position having its center of gravity offset with respect to a vertical plane passing through its axis of rotation whereby to produce an unbalanced condition of said rod tending to urge said handle in a direction for rotation towards said abutment whereby to resist swinging of said handle in a direction for release of the coupler anti-creep.

8. In a railway car, an operating means for use with a bottom lift coupler having an anti-creep and mounted upon said car so as to move longitudinally and laterally thereof in service and having a member mounted upon the coupler to move therewith and arranged to operate the coupler upon rotation thereof; comprising, an uncoupling rod, means upon said car supporting the outer end of said rod for rotatable and endwise movement, said rod being connected at its inner end directly to said member, an abutment upon said car positioned to engage said rod for holding said rod in normal position and said rod having a portion offset from a vertical plane passing through the axis of rotation of said rod, said offset portion in normal position of said rod serving to produce an unbalanced condition of said rod tending to rotate said rod in a direction to engage said abutment and in a direction to resist swinging movement thereof in a direction for release of said coupler anti-creep.

9. In a railway car, the combination of a coupler provided with an anti-creep, an operable lock and a rotary member for transmitting operating movement to said lock, an endwise movable and rotatable operating rod operatively connected to said rotary member and provided with a depending crank handle adjacent its outer portion, and a bracket mounted upon the car supporting the outer portion of the operating rod and provided with an inclined guide portion cooperating with said handle for guiding the rod in its endwise movement and holding the handle and rod against gravitation in an unbalanced condition in any service position of the coupler so as to tend to prevent a swinging movement of the operating rod handle which would release the coupler anti-creep.

10. In a railway car, the combination of a coupler provided with a lock and a rotary member, a bracket member secured to said car, and means for operating said lock, said means including an operating rod supported in said bracket and extending to and directly connected with said rotary member, said rod having a handle adjacent said bracket, and an abutment on said car so positioned to hold said rod in normal position such that said handle serves to provide a weighted portion out of line with the axis of rotation of the rod to produce an unbalanced condition tending to urge said handle in a direction toward said abutment whereby to resist swinging movement of said handle in a direction for release of the coupler.

11. In a railway car, the combination of a coupler provided with a lock and a rotary member, a bracket member secured to said car, means for operating said lock, said means including an operating rod supported for rotation and endwise movement in said bracket and extending to and directly connected with said rotary member, said rod having a handle provided with an offset portion adjacent said bracket tending to urge said rod toward said bracket, and an abutment on said car so positioned to hold said rod in normal position such that said offset portion serves to provide a weighted portion out of line with the axis of rotation of the rod to produce an unbalanced condition tending to urge said handle in a direction toward said abutment whereby to resist swinging movement of said handle in a direction for release of the coupler.

12. In a railway car having a bottom lift coupler provided with an anti-creep, the combination of an operable lock associated with said anti-creep, a rotary member for transmitting operating movements to said lock, an uncoupling rod mounted for rotation upon said car for operating said rotary member, said rod comprising a depending operating handle, and an abutment upon said car positioned to hold said rod in normal position such that the handle serves to provide a weighted portion out of line with the axis of rotation of the rod to produce an unbalanced condition tending to urge said handle in a direction toward said abutment whereby to resist swinging of said handle in a direction for release of said coupler anti-creep.

Signed at Alliance, Ohio, this 8th day of April, 1929.

EDMUND P. KINNE.